Patented Dec. 28, 1937

2,103,953

UNITED STATES PATENT OFFICE 2,103,953

COLLOIDAL PLANT FOOD AND STIMULANT

Charles Northen, Orlando, Fla.

No Drawing. Application October 22, 1936.
Serial No. 107,101

6 Claims. (Cl. 71—2)

The present invention relates to a plant food, and more particularly to such a food in a colloidal state.

The old theory has been that good crops can be produced by fertilizing the soil with the three major plant foods, viz, nitrogen, phosphorus, and potash. This theory has been generally discarded, as healthy vegetation of every sort requires, and is constantly absorbing, more than twenty mineral elements from the soil. All plant and animal life, it may be safely said, would disappear from the earth if it were not for the natural mineral colloids in the soil.

If man opposes nature by steadily depleting the soil of its rarer mineral elements, through the yearly harvesting of crops, and makes no provision for replacing these elements, he gradually robs the soil of its fertility, and the mere addition of fertilizers containing nitrogen, phosphorus, and potash will not restore their fertility. Competent authorities have stated that the value of any agricultural soil will soon be measured by the quantity and the quality of natural colloids therein.

This invention, therefore, is directed to a composition of matter and the method of preparing the same, which composition of matter is in a finely divided colloidal state and disintegrates almost instantly when moistened, and which, when applied to the soil, 96% of the composition is immediately available as plant food.

In other words, the colloidal plant food is so fine that it is taken up in suspension by plant food solutions and is, in turn, built into the cell structure of plant life without the necessity of becoming soluble.

This colloidal plant food has great value when considered both from a physical and a chemical point of view. It prevents leaching and holds moisture, nitrogen, potash, and other plant foods in the soil. It balances the soil and permanently improves its crop-production capacity. The physical properties of this plant food are such that they are excellent soil amenders and have a range of action much wider than fertilizers.

The above advantages and others attributable to the novel plant food of this application will be apparent from a detailed exposition of its physical and chemical properties and the method of preparing the same.

As is well known, there are certain natural deposits in the United States, particularly in such localities as Florida and Tennessee, in which agricultural phosphate rock deposits are found. This phosphate rock is mined, as by the use of steam shovels and the like, the shovels lifting the entire mass of the material from the earth, both matrix and rocks. This material is deposited on what are commonly known as "log washers" and water is passed over the material, washing away all foreign matter, leaving the rock clean. This foreign matter is dumped with the water at the end of the log washer and runs by gravity to some depression in the earth's surface, or to an impounding dam. The colloidal plant food, also known as "colloidal phosphate" or "waste pond phosphate", is in the matrix and on the surface of the hard rock. Naturally, the heavier and coarser materials settle first, while the lighter material flows away with the water as far as the water goes. The length and distance this water runs, together with the slope over which it is passed, determines, to some extent, the quality of the fine material obtained and which is known as "colloidal phosphate" or "waste pond phosphate".

The chemical composition of the waste pond phosphate is largely determined by the manner of refining and the source of the deposit. Experimentation has proven that a composition having approximately the following chemical analysis constitutes a standard product and forms an excellent base to be used in the manner hereinafter described.

| | Per cent |
|---|---|
| Phosphoric acid | 26.40 |
| Calcium oxide | 31.26 |
| Alumina | 5.45 |
| Oxide iron | 4.26 |
| Carbon dioxide | 12.40 |
| Soda | .56 |
| Potash | 1.16 |
| Carbonate of lime | 7.83 |
| Manganese dioxide | .05 |
| Magnesia | 1.10 |
| Sulphur | .57 |
| Fluorine | .72 |
| Titanium | .42 |
| Iodine, vanadium, chromium, other rare elements and silicious materials | 7.82 |

However, it becomes important to control the range of certain chemical compounds present in the plant food. For example, the amount of calcium present should be controlled, as by the addition of calcium-containing materials, the added calcium being in an amount of from 2% to 30% of the aforementioned base. Magnesium, also, should be added in about the same ratio as the calcium. In some instances, it is desirable to add copper, preferably in a range from .5% to 5.%; zinc in about the same quantity; iodine from .05% to 1.%; borax from .05% to 5.%; and manganese from .5% to 3.%. The calcium may be added in the form of calcium carbonate or oxide. The magnesium may be added in the form of carbonate or oxide or sulphate of magnesium. The copper may be an oxide or a sulphate or colloidal copper. The zinc may be an oxide or sulphate or colloidal, as may be the manganese. The iodine may be colloidal or in the form of iodide of potash or tincture of iodine or any organic combinations carrying iodine.

It will be understood that a plant food formed as above described contains more of the rare mineral elements required by all vegetable life than many other products known to agriculture.

The plant food is non-acid and non-burning. It sweetens the soil economically and safely, giving larger crops at less cost.

It restores the run-down, depleted soil to its rich, virgin condition of productiveness.

It attracts and tenaciously holds moisture in the soil. There is less danger from drought where it has been liberally used.

It hastens germination of seeds and maturity of all kinds of crops, and greatly develops the root system, thus giving the plant a quick start.

As it will not leach, it can be put down in any quantity at any time with beneficial results, whether separately or in conjunction with any other fertilizer desired. The longer it has to blend with the soil, the better its action.

The plant food of the instant application tenaciously holds nitrogen, potash, and other plant foods in the soil, thus preventing their leaching until such time as the vegetation is able to take them up. As it is rich in phosphorus, the same results can be obtained with much lower percentages of ammonia and potash than otherwise would be necessary.

It stimulates, feeds, and increases soil bacteria, and can be safely used in any quantity at any time.

It will improve the carrying quality and sugar content, as well as the quantity yield, of all fruits and vegetables.

As it is inexpensive, several tons can be purchased for the price of one ton of fertilizer. Likewise, it costs much less than superphosphate, although its agricultural value, ton for ton, is twice as great.

It will cause seeds placed in the soil to come through two or three days ahead of those where soils have been fertilized with commercial fertilizers only.

It will cause fruits and vegetables to mature from several days to several weeks earlier. Such fruits and vegetables will also be more firm, tasty, and have far better carrying qualities.

To compare the properties of the plant food of the instant application with a plant food, such as bone meal, it might be stated that the mineral elements in bone meal are colloidal but are not available as plant food until nitrified (broken down) by soil bacteria.

The plant food of the instant application contains as much calcium as bone meal. It also contains as much phosphorus and, in addition, more than twenty of the other mineral values necessary to plant life. All are in a free colloidal condition and are thus ready as plant food.

From the above, it will be appreciated that it is superior to bone meal and much lower in cost.

While the composition has been specifically described as a plant food, it has also been found useful as an agricultural product generally and as an animal food supplement.

It will be seen from the foregoing that there has been produced a plant food of great value, and what I claim as new and desire to secure by Letters Patent is:—

1. A composition of matter for stimulating plants comprising an intimate mixture of finely divided natural colloidal phosphate fertilizer and colloidal compounds of calcium, magnesium, copper, zinc, iodine, boron, and manganese, the ratio by weight of the phosphate fertilizer to the added calcium and magnesium compound each being as 100 is to between 2.0 and 30.0 constituting a homogeneous composition in which all of the ingredients are in a finely divided colloidal state and in substantial and beneficial quantities.

2. A composition of matter for stimulating plants comprising an intimate mixture of finely divided natural colloidal phosphate fertilizer and colloidal compounds of calcium, magnesium, copper, zinc, iodine, boron, and manganese, the ratio by weight of the phosphate fertilizer to the added zinc and copper compounds each being as 100 is to between .5 and 5.0 constituting a homogeneous composition in which all of the ingredients are in a finely divided colloidal state and in substantial and beneficial quantities.

3. A composition of matter for stimulating plants comprising an intimate mixture of finely divided natural colloidal phosphate fertilizer and colloidal compounds of calcium, magnesium, copper, zinc, iodine, boron, and manganese, the ratio by weight of the phosphate fertilizer to the added iodine compound being as 100 is to between .05 and 1.0 constituting a homogeneous composition in which all of the ingredients are in a finely divided colloidal state and in substantial and beneficial quantities.

4. A composition of matter for stimulating plants comprising an intimate mixture of finely divided natural colloidal phosphate fertilizer and coloidal compounds of calcium, magnesium, copper, zinc, iodine, boron, and manganese, the ratio by weight of the phosphate fertilizer to the added boron compound, namely, borax, being as 100 is to between .05 and 5.0 constituting a homogeneous composition in which all of the ingredients are in a finely divided colloidal state and in substantial and beneficial quantities.

5. A composition of matter for stimulating plants comprising an intimate mixture of finely divided natural colloidal waste pond phosphate fertilizer and colloidal compounds of calcium, magnesium, copper, zinc, iodine, boron, and manganese, the ratio by weight of the phosphate fertilizer to the added manganese compound being as 100 is to between .5 and 3.0 constituting a homogeneous composition in which all of the ingredients are in a finely divided colloidal state and in substantial and beneficial quantities.

6. A composition of matter for stimulating plants comprising an intimate mixture of finely divided natural colloidal phosphate fertilizer and colloidal compounds of calcium, magnesium, copper, zinc, iodine, boron, and manganese, the ratio by weight of the added fertilizer to each of the added compounds being as follows and constituting a homogeneous composition in which all of the ingredients are in a finely divided colloidal state: phosphate fertilizer 100 parts to between 2.0 and 30.0 parts of the calcium compound; phosphate fertilizer 100 parts to between 2.0 and 30.0 parts of the magnesium compound; phosphate fertilizer 100 parts to between .5 and 5.0 parts of the copper compound; phosphate fertilizer 100 parts to between .5 and 5.0 parts of the zinc salt; phosphate fertilizer 100 parts to between .05 and 1.0 parts of the iodine compound; phosphate fertilizer 100 parts to between .05 and 1.0 parts of the boron compound; and phosphate fertilizer 100 parts to between .5 and 3.0 parts of the manganese compound.

CHARLES NORTHEN.